United States Patent [19]

Lindbergh

[11] 4,417,646
[45] Nov. 29, 1983

[54] COUNTERWEIGHT SYSTEM

[76] Inventor: Charles Lindbergh, 104 N. Star Ave., Panama City, Fla. 32401

[21] Appl. No.: 212,292

[22] Filed: Dec. 2, 1980

Related U.S. Application Data

[63] Continuation of Ser. No. 934,402, Aug. 17, 1978, abandoned.

[30] Foreign Application Priority Data

Aug. 19, 1977 [DE] Fed. Rep. of Germany ....... 2737493
Dec. 28, 1977 [DE] Fed. Rep. of Germany ....... 2758383

[51] Int. Cl.³ .............................................. B66B 17/12
[52] U.S. Cl. ..................................... 187/94; 254/387
[58] Field of Search ............................ 187/94, 70, 15; 248/364; 212/48; 254/387

[56] References Cited

U.S. PATENT DOCUMENTS 736,234  8/1903  Delp ..................................... 254/387
3,768,596 10/1973 Solymos ................................ 187/94

Primary Examiner—Joseph J. Rolla
Assistant Examiner—Kenneth Noland
Attorney, Agent, or Firm—Newton, Hopkins & Ormsby

[57] ABSTRACT

A movable load exerts varying static and dynamic forces which need to be counteracted with a minimum expenditure of energy. A counterweight connected to the movable load consists of two groups of counterweight components, wherein during movement of the load component weights in the second group are raised with respect to component weights in the first group when the counterweight is at its lowest position, or by the same absolute displacement during counterweight ascent whereby the energy introduced into the system equals the product of the total weight of components in the second group times the distance of lifting whereby the purpose of energy introduction is to counteract frictional losses of a variably counterweighted system maintaining cyclic controlled motion of the load system as desired.

3 Claims, 30 Drawing Figures

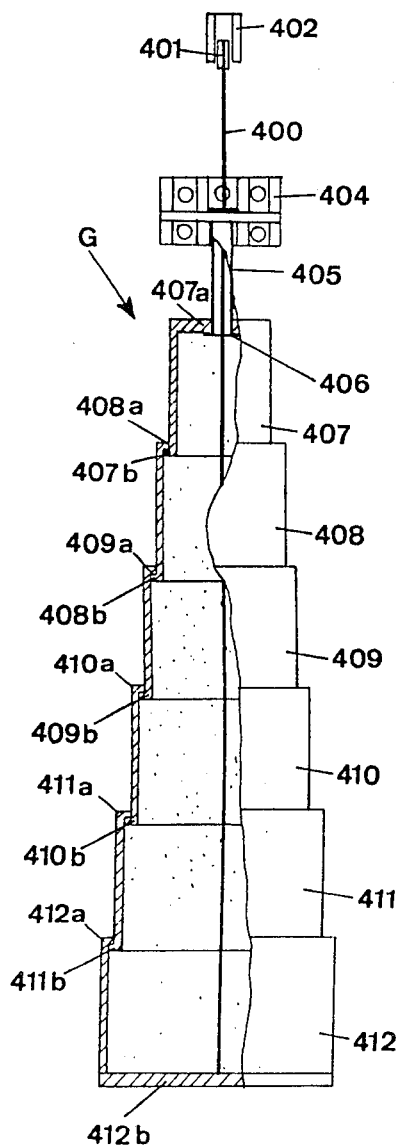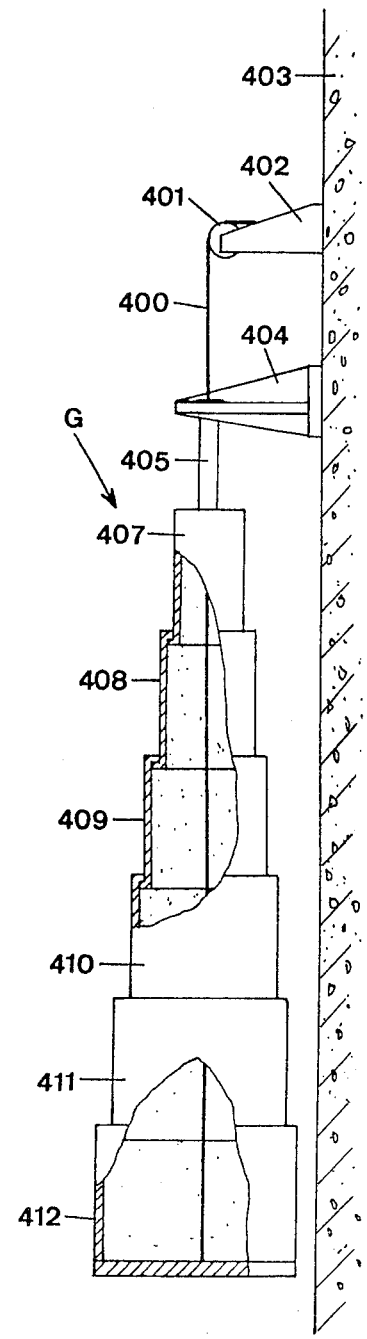
Fig. 7
PRIOR ART
Fig. 8
PRIOR ART

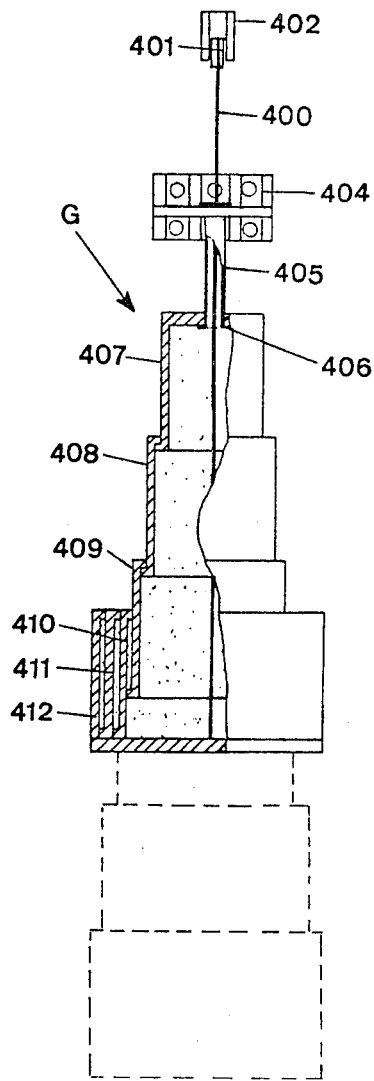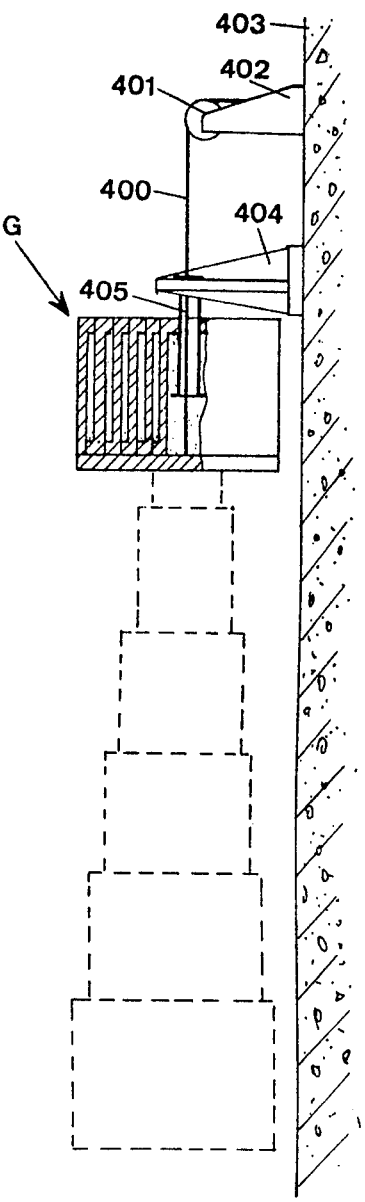
Fig. 9
PRIOR ART
Fig. 10
PRIOR ART

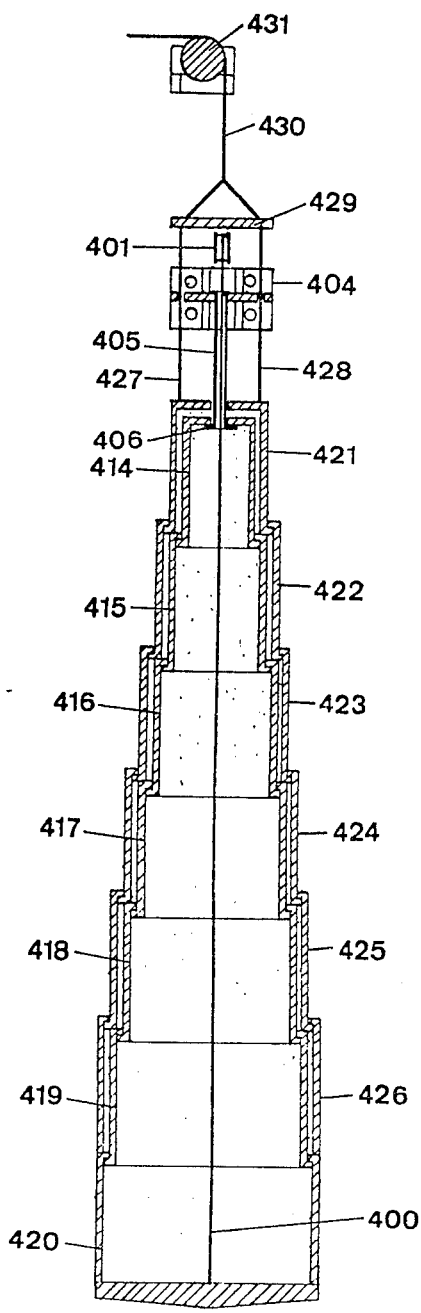
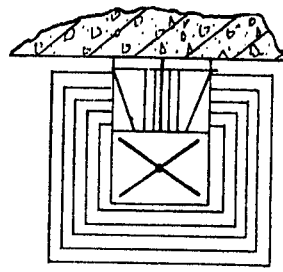
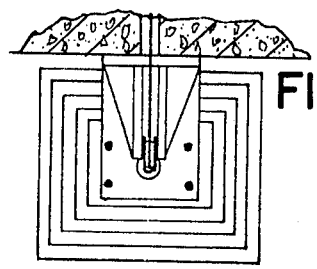
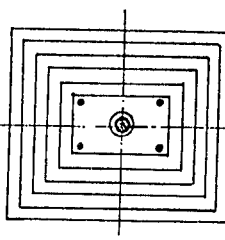
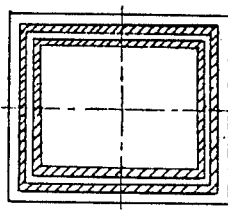
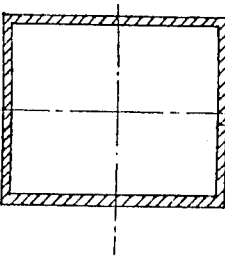
Fig. 13

COUNTERWEIGHT SYSTEM

CROSS-REFERENCE TO RELATED APPLICATION

This application is a continuation of prior application Ser. No. 934,402, filed Aug. 17, 1978, for IMPROVED COUNTERWEIGHT SYSTEM, now abandoned.

BACKGROUND OF THE INVENTION

In the above referenced pending application, a counterweight composed of weight components is connected to a movable load which exerts varying static and dynamic forces requiring counteracting with a minimum input of energy into the system. The force counteracting effectiveness of the counterweight components which may be individually arrested during movement of the load.

The present invention addresses the same problem of counteracting static and dynamic forces exerted by a movable load through further development of the counterweight to enable it to counteract the load exerted forces in a finer degree during movements of the load. This increased force counteracting ability of the counterweight in the present invention is achieved by dividing the counterweight into two groups of weight components, and making provision for lifting components of the second group a limited amount relative to components of the first counterweight group when the counterweight is at its lowest position.

For this design of the counterweight system, there are several parameters permitting the adaptation of any desired motion, such as the number of partial weights of the two groups, the weights (masses) of the partial weights, the locations where the stop means for the partial weights of both groups are mounted and the distance by which the partial weights of the second group are raised.

The partial weights of the first group being mounted one on top of the other and cooperating with fixed stop means; one preferred embodiment of the invention so designs the second group of partial weights that at least a few partial weights of the first group are sub-divided into two parts which may move relative to each other in the vertical direction and are mounted one above the other, and in that provision is made for a support connected with the lifting system for each upper part and displaceable by a limited amount in height.

In this case the lifting system for the supports of the upper parts are designed in such manner it raises these supports sequentially by that limited height. This design allows raising the partial weights of the second group, which rest on these supports, with very small forces and accordingly low power.

This invention furthermore applies to a counterweight system in which two neighboring partial weights of each group are interconnected by members permitting a restricted relative motion between these two partial weights, one terminal partial weight of the first group being connected to the load and the other terminal partial weight of the first group cooperating with spatially fixed stop. In this case the counterweight preferably is so designed that the partial weights of each group can be telescoped into themselves and that telescoping partial weights of the second group are mounted coaxially with the partial weights of the first group, and that the second group of partial weights can be lifted by a restricted height relative to the first group by means of the lifting system.

Further characteristics and advantages of the invention result from the following description of illustrative embodiments of the invention.

FIG. 7 is a partial section in front view of a counterweight system with a telescoping counterweight;

FIG. 8 is a partial section in side view of the counterweight system of FIG. 7;

FIG. 9 is a partial section in front view of the counterweight system of FIGS. 7 and 8 when the counterweight is partly raised;

FIG. 10 is a partial section in side view of the counterweight system of FIGS. 7, 8 and 9 when the counterweight is fully raised;

FIG. 13 is a longitudinal section through the counterweight system of FIGS. 11 and 12;

FIGS. 14a through 14e are horizontal sections taken on lines A—A through E—E in FIG. 11;

Figure 1:
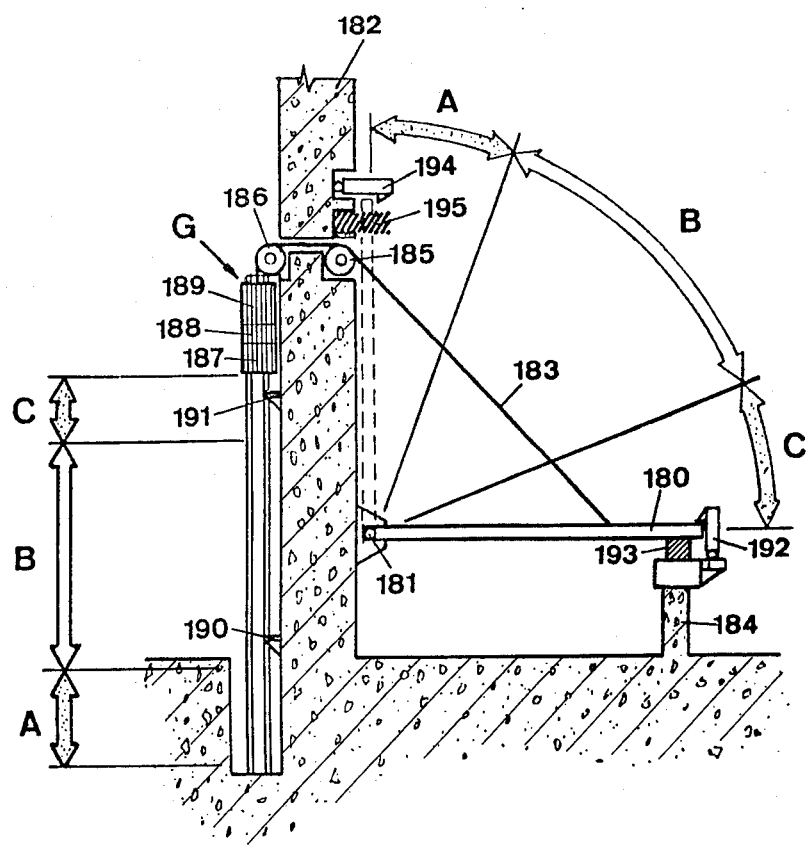
FIG. 1 is a schematic of an application example of the counterweight system of the invention.
Figure 16:
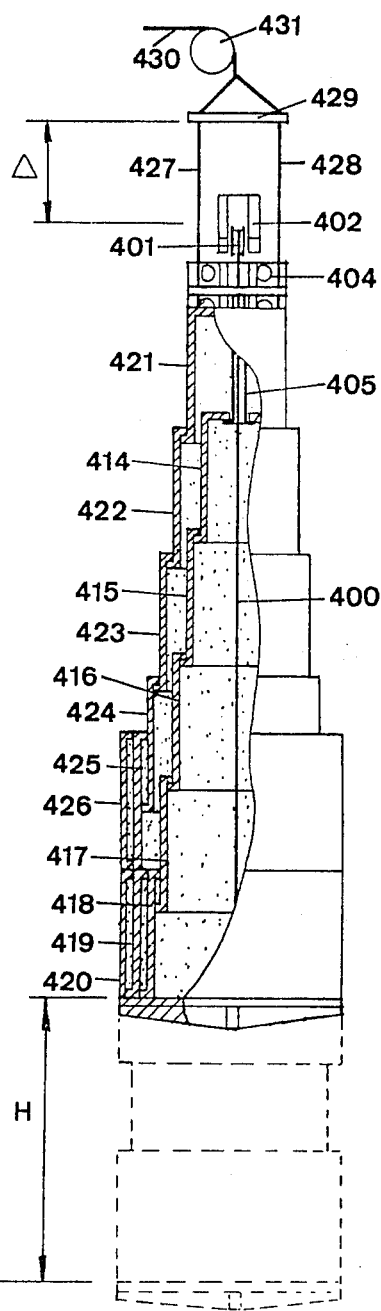
FIG. 16 is a partial section in front view of the counterweight system of FIGS. 11 through 15 for the counterweight partly raised.

The application example of the counterweight system shown in FIG. 1 is the system of FIG. 16 of the above mentioned prior application in which the load is a pivoting member 180 held in rotable manner at one end in a vertical wall 182 so as to pivot about a horizontal axis 181. Pivoting member 180 can be raised by means of a cable 183 from the horizontal position, shown in full lines and in which it rests on a support 184, into the vertical position shown in dashed lines. Cable 183 is guided over two pulleys 185, 186 and at its other end holds a variable counterweight G. For simplification the counterweight G shown is subdivided into three partial weights 187, 188, 189 of which the lowermost 187 is solidly connected to cable 183, while the upper partial weights 188, 189 can glide relative to the cable; projections 190 and 191 are mounted at suitable heights in such manner that they catch the partial weights 188 and 189 respectively in their descent and thereby vary the effective counterweight. Counterweight G however preferably is subdivided into a larger number of partial weights.

A locking system 192 is mounted to support 184 which keeps the pivoting member 180 in the horizontal position; this locking system is represented as a pivotably supported pawl for the sake of simplicity, pivoting member 180 automatically latching with it when descending, which can be released by means not shown when pivoting member 180 is to be freed. A spring 193 is so mounted on support 184 that it will be compressed by the pivoting member 180 when latching with pawl 192. A second locking system 194 in the shape of a pivotable, retractable pawl 194 is mounted on wall 192 in such manner that it latches the pivoting member 180 in the vertical position, and a second spring 195 is so fixed to wall 182 that it will be compressed by pivoting member 180 when latter latches with pawl 194.

This counterweight system operates as follows.

Let is be assumed that the parts are in the positions shown in solid lines in FIG. 1. The pivoting member 180 is horizontal, rests on the compressed spring 193 and latches with pawl 192; the counterweight G is in its highest position, for which the two upper partial weights 188, 189 rests on the lowermost partial weight 187, so that the sum of the three partial weights 187, 188, 189 act as counterweight on the cable 183. This sum is so selected that its tension on the cable exceeds the opposing force exerted by the pivoting member 180 in the horizontal position.

Pawl 192 is retracted to raise the pivoting member 180. The pivoting member 180 receives a positive acceleration on one hand by the decompression of the spring 193 and on the other hand by the excess of tension from counterweight G. The pivoting member 180 therefore moves across the angular range C with increasing speed, upwards, and the counterweight G descends a corresponding distance C.

After passing through the range C, the uppermost partial weight 189 hits projection 191, which retains it. Therefore only the partial weights 187 and 188 remain effective as counterweight in the adjacent range B. These two partial weights are so selected that the pivoting member 180 moves with approximately constant speed through the range B. This condition may not be precisely met for a pivoting member with a counterweight that remains constant because the static force exerted by the pivoting member is constantly changing; keeping a precisely constant speed within this middle range however is not the point at all, and anyway if it were desired an arbitrarily close approximation could be achieved by further subdivision of the counterweight G into a larger number of partial weights.

The partial weight 188 is retained at the end of the range B by projection 190, whereby only partial weight 189 remains as the counterweight. This partial weight is so selected that the tension exerted by it on cable 183 is less than the opposing force exerted by the pivoting member 180 in the upper angular range A. Therefore the pivoting member 180 is subjected to a negative (downward) acceleration, whereby it approaches its vertical position with decreasing speed. The negative acceleration is so chosen that the pivoting member 180 retains however significant speed when reaching spring 193, the remaining kinetic energy being enough to compress spring 195 that the pivoting member 180 can latch with pawl 194.

Accordingly the pivoting member 180 was raised solely through the action of the counterweight G; the ascent can take place in a very short time, as for proper selection of the partial weights, the positive acceleration within the range C can be quite large, whereby the motion in range B will take place at high speed. Because of the deceleration in range A, the pivoting member 180 nevertheless gently coasts into its upper terminal position.

The kinetic energy imparted to pivoting member 180 in range C is stored in the upper terminal position to the largest part as potential energy in the pivoting member itself; a small part of the kinetic energy is stored as spring energy in spring 195, which thereby acts as energy storage.

No more is required to bring the pivoting member 180 from the vertical upper terminal position into the lower horizontal one again than releasing the upper pawl 194. The energy stored in spring 195 suffices to impart an initial acceleration to the pivoting member 180. The moment the pivoting member 180 leaves the vertical position, a downward weight component is generated, which soon itself exceeds the weight of the lowermost partial weight 187, whereby a downward (or negative) acceleration is sustained to pivoting member 180 in the range A. Therefore, the pivoting member 180 within range A moves downward with increasing speed. The partial weight 188 is removed from projection 190 at the end of range A, so that again the two partial weights 187 and 188 act as counterweight. Therefore the pivoting member 180 moves with nearly constant speed downward through range B. Lastly the uppermost partial weight 189 also is taken on at the end of range B, whereby again the whole counterweight is effective and the pivoting member 180 is decelerated by an upward, or positive acceleration. The pivoting member 180 therefore gently coasts into the lower terminal position, its speed when reaching spring 193, however, being sufficiently large that enough kinetic energy remains to compress said spring enough to latch the pivoting member 180 with pawl 192.

The various parts then resume their positions shown in FIG. 1, and the processes described are repeated upon releasing pawl 192.

If the system described were lossless, the described processes could be repeated arbitrarily often without any supply of external energy. In actuality, however, losses do occur, especially by friction, air resistance, etc., which must be covered by supplying external energy.

The system shown in FIG. 1 offers an especial advantage in that the energy required to cover the losses need not necessarily by supplied during the raising or lowering of the load, rather that it can be fed during the pauses between operation, and stored during them. As in general such pauses are much longer than the periods of duty, the energy supply can be spread over a long time, so that only low power is required. Therefore small and economical equipment suffices to cover the energy balance, whereby it is feasible to move a heavy load in a short time, i.e., while spending low power.

The variable counterweight G itself being an energy storage, the additional energy required to cover the losses may also be put into the counterweight. This can be implemented by temporarily enlarging the weight of the counterweight when in its highest position (corresponding to the lowest position of the load) and/or by decreasing the weight of the counterweight when in its lowest position (corresponding to the highest of the load). The first step is equivalent to increasing the potential energy stored in the counterweight; the additional potential energy upon releasing the load is converted into kinetic energy, the larger counterweight imparting a higher initial acceleration to the load at the beginning of the ascent. The second step is equivalent to an increase of the potential energy stored in the load, whereby an increased initial acceleration is imparted to the load at the beginning of its descent and hence additional kinetic energy. The additional energy thus introduced into the system can always be used to cover the losses.

Figure 17:
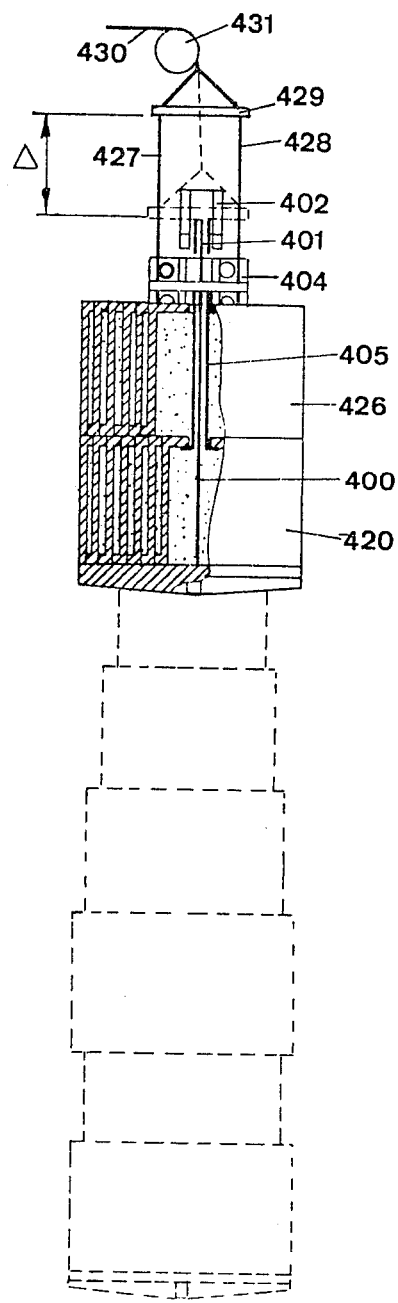
FIG. 17 is a partial section in front view of the counterweight system of FIGS. 11 through 16 for fully raised counterweight.
Figure 18:
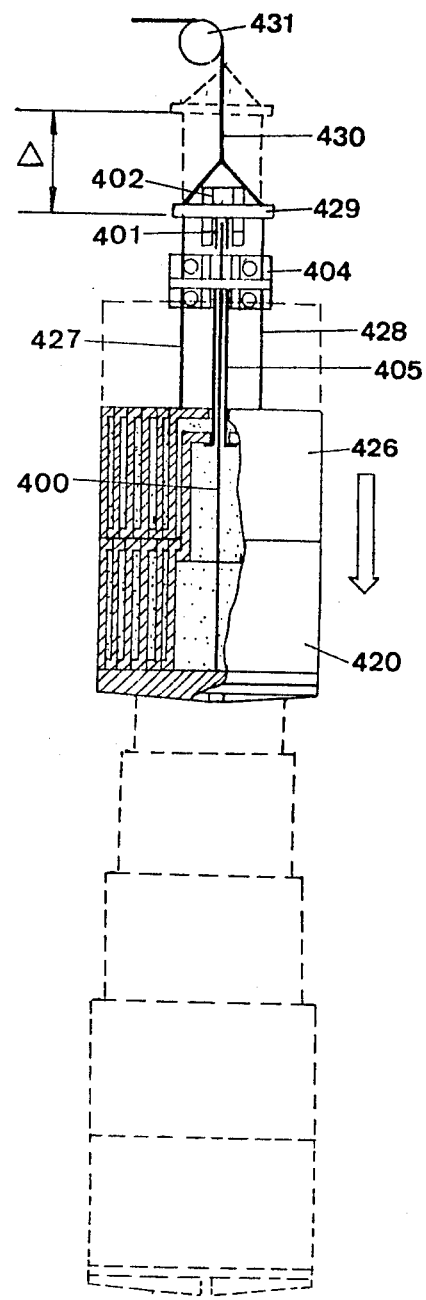
FIG. 18 is partial section in front view of the counterweight system of FIGS. 11 through 17 during the descent of the counterweight.

FIGS. 17 and 18 of the main application show a counterweight system in which the additional energy is stored in the counterweight system by sub-dividing the uppermost and lowermost partial weights into two parts which can move relative to each other in the vertical direction; each upper part is associated with a support which can be displaced by a limited vertical distance, and provision is made for equipment be means of which the two supports together with the weight components on them can be simultaneously lifted.

FIGS. 2 through 6 show a counterweight system based on the same principle but allowing to introduce the additional energy at considerably lesser power.

The counterweight G acting on cable 300 is subdivided into five partial weights 301, 302, 303, 304, 305 shown most clearly in FIG. 2c, where they are distinctly separate. The transverse dimensions of the partial weights are different, so that each upper weight 305, 304, 303, 302 projects somewhat on the sides beyond the partial weight 304, 303, 302, 301 respectively immediately below it. The lowermost partial weight 301 is suspended from cable 300, while the other partial weights 302, 303, 304, 305 can glide with respect to cable 300.

A guideway for the partial weights consists of two vertical sideways posts 306,307 to which are mounted projections 309, 309, 310, 311 at different elevations, which protrude by different amounts into the paths of the motion of the partial weights, whereby projections 311 retain the first partial weight 305, projections 310 the partial weight 304, projections 309 the partial weight 303 and projections 308 the partial weight 302. A fixed support 312 is provided for the lowermost partial weight 301.

Several of the partial weights always are subdivided into two parts each which can be displaced relative to each other in the vertical direction, and devices are provided to raise the upper part with respect to the lower part by a limited distance. Illustratively the partial weights 301, 302, 304, 305 are subdivided in this manner; only the center partial weight 303 is not subdivided.

The lowermost partial weight 301 consists of two parts 301a and 301b of which the former is solidly connected to the cable 300, while the upper part 301b rests on lower part 301a and can glide with respect to cable 300. Similarly the partial weight 302 is subdivided into two parts 302a, 302b, the partial weight 304 into two parts 304a, 304b and the uppermost partial weight 305 into two parts 305a, 305b.

Four lifting frames 313, 314, 315, 316 each are supported between the two posts 306, 307 of the guideway so as to be displaceable along a limited vertical distance. The lifting frame 313 is displaceable between the support 312 and the projections 308, and designed to carry along the upper part 301b, but not the lower part 301a, of partial weight 301 when ascending. Similarly the lifting frame 314 is displaceable between the projections 308 and 309 and designed to carry along the upper part 302b of the partial weight 302; the lifting frame 315 is displaceable between the projection 310 and 311 and designed to carry along the upper part 304b of partial weight 304, and lastly lifting frame 316 is displaceable above the projections 311 and designed to carry along the upper part 305b of the partial weight 305.

The displacements of the lifting frames 313, 314, 315, 316 take place in a manner to be discussed more closely below by means of two lifting cables 317, 318 passing along the posts 306, 307 and guided over direction-changing rollers 319,320 to a winch 321 (FIG. 3a), so that the lifting frames can be raised or lowered by means of this winch 321.

Figure 4:
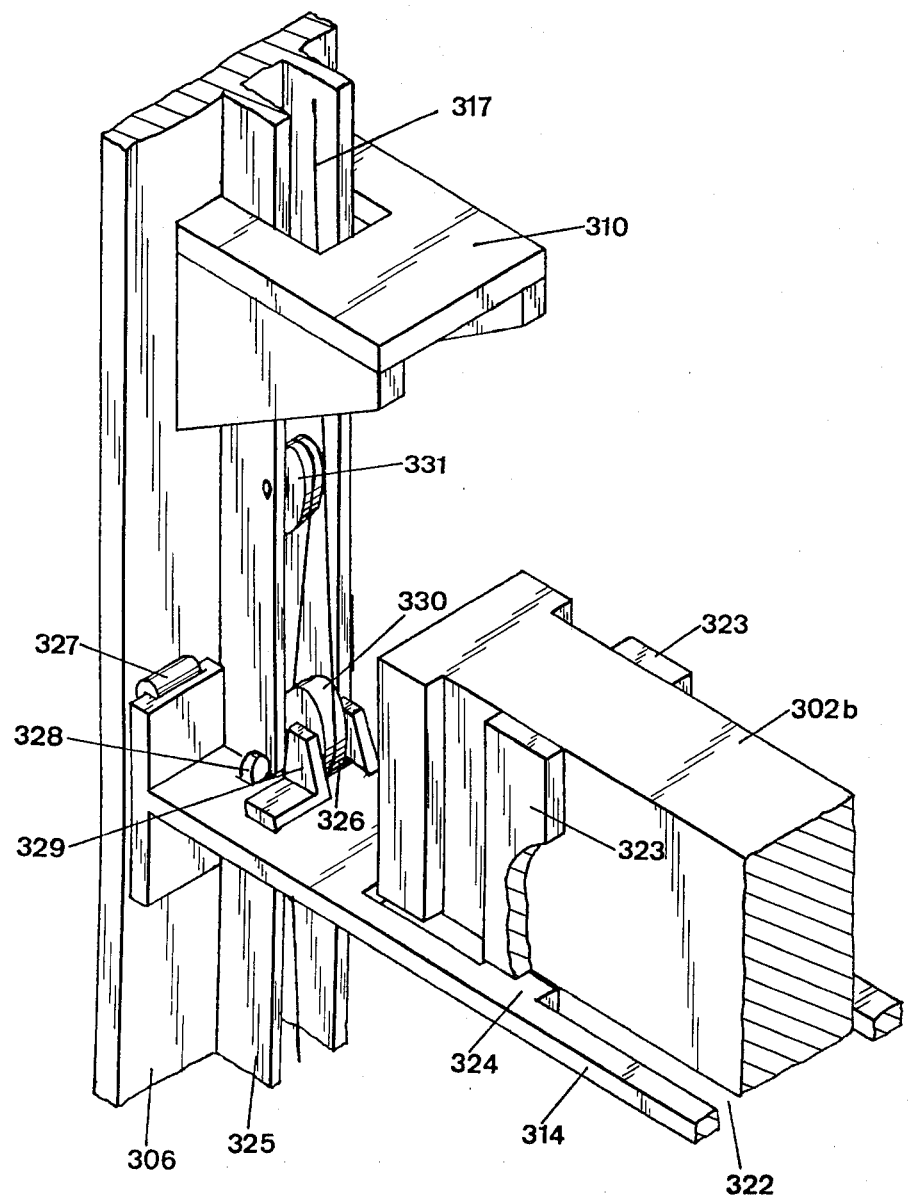
FIG. 4 is an enlarged partial perspective of part of the counterweight system of FIGS. 2 and 3.

The design of lifting frame 314 is illustratively shown in FIG. 4 in an enlarged partial perspective; the other lifting frames are of similar design. Lifting frame 314 comprises an aperture 322 of such dimensions that the lower part 302a (not shown in FIG. 4) of the partial weight 302 as well as all still lower partial weights (301a and 301b) can glide through this aperture. On the other hand, sideways ledges 323 are located against the upper part 302b of partial weight 302 which copperate with ledge projections 324 at lifting frame 314, that protrude inside the opening 322. Therefore the upper part 302b of partial weight 302 cannot pass through the opening 322 but rather rests on the lifting frame 314 when lowered to the level of the lifting frame. Upper parts of other partial weights (301b, 304b, 305b) are also similarly equipped with sideways ledges and their respective lifting frames similarly equipped with ledge projections. However, these are of lengths and offset positions such as do not interfere with the travel of lower partial weights through the various lifting trays. The vertical post 306 comprises a U-shaped guide 325 which penetrates a cut-out 326 of lifting frame 314. Guide-rollers 327, 328 serve to guide the lifting frame along post 306 and outside of the U-shaped guide 325. A cable pulley 330 is supported in two bearing blocks 329 at lifting frame 314 above cut-out 326, and a further cable pulley 331 is supported inside the U-guide 325 closely spaced from and underneath projection 310. The lifting cable 317 is guided by means of cable pulleys 330 and 331.

The other, not visible end of the lifting frame 314 shown in FIG. 4 and cooperating with the sideways post 307 obviously is of the same design and corresponding cable pulleys are provided which cooperate with the other lifting cable 318.

Figures 5, 6:
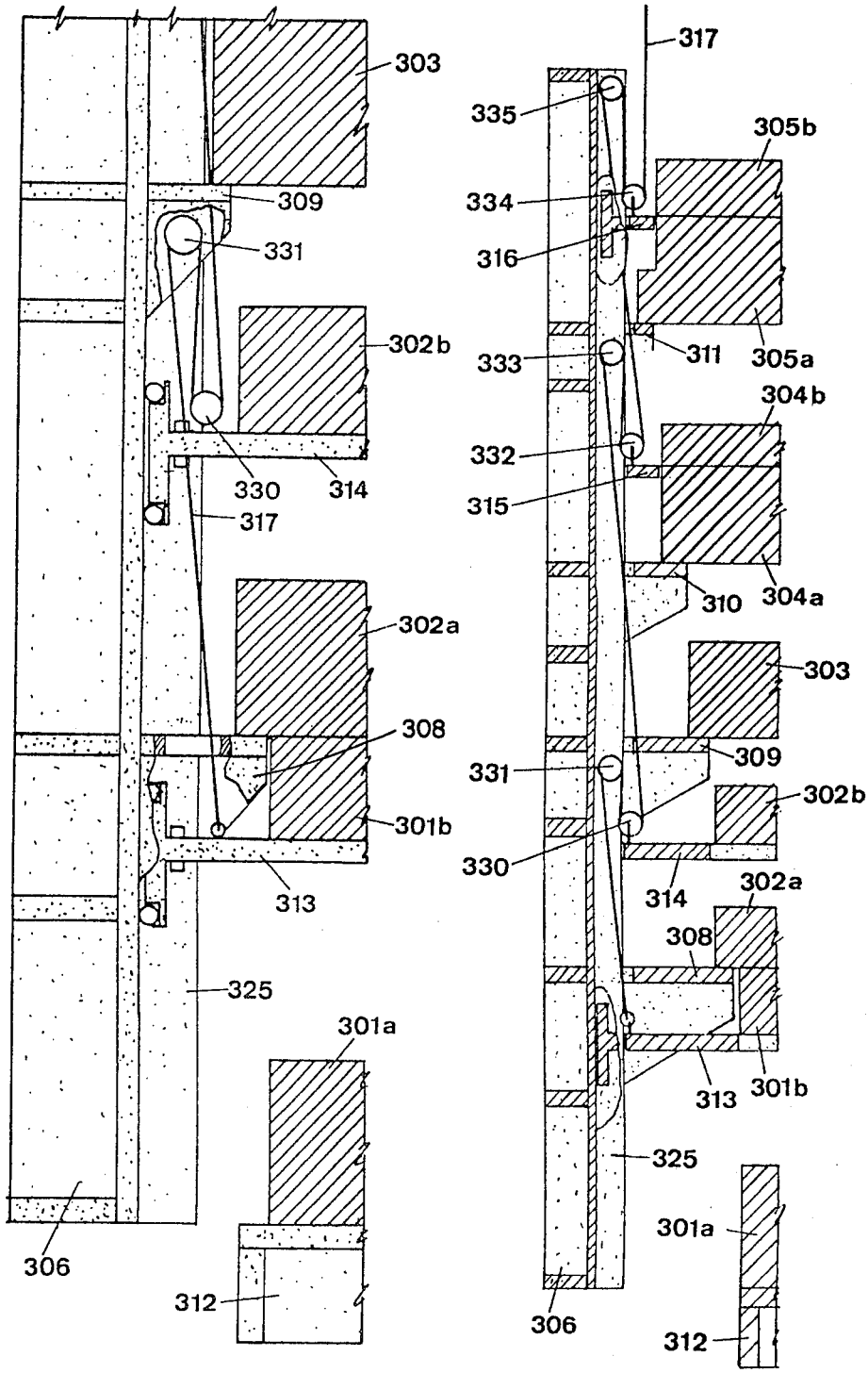
FIG. 5 is a side-section of one side of the counterweight system of FIGS. 3 and 4.
FIG. 6 is a partial enlargement of the side-section of FIG. 5.

Besides the already cited cable pulleys 330,331 associated to lifting frame 314, FIG. 5 also shows in a schematic section the cable pulley 332 mounted to lifting frame 315 and the associated spatially fixed cable pulley 334 and the associated cable pulley 335, also spatially fixed. Each spatially fixed cable pulley 331, 333, 335 is mounted at such an elevation in the U-guide 325 that for the highest position of the associated lifting frame 314, 315, 316 respectively it will be still above the cable pulley 330, 332, 334 respectively mounted to the lifting frame.

Lifting cable 317 first passes over cable pulley 334 of the uppermost lifting frame 316 and then over the associated spatially fixed cable pulley 335. Then the lifting cable passes over the cable pulley 332 of the lifting frame 315 and then again upwards over the spatially fixed cable pulley 333, from there downward over cable pulley 330 of the lifting frame 314, again upward over the cable pulley 331 and lastly down again to lifting frame 313, where the end of the lifting cable 317 is anchored. Selectively a further cable pulley might be mounted to lifting frame 313, over which the lifting cable 317 would be reversed once more; the end of the lifting cable then would be at post 306 at a location above the highest position of lifting frame 313.

FIG. 6 shows an enlarged section of the guidance of the lifting cable 317 in the region of the two lowermost lifting frames 313 and 314.

In order that the described counterweight system function properly, it is furthermore important that the weight-parts 301b, 302b, 304b, 305b cooperating with the lifting frames 313, 314, 315, 316 each be of different magnitudes; it is assumed in the example shown that weight-part 301b is the smallest and that weight-parts 302b, 304b, 305b each are increasingly larger.

Assuming that the cable 300 in lieu of cable 183 of FIG. 1 is connected with the pivoting member 180 represented in that figure, then the following operation applies to the counterweight system of FIG. 2 through FIG. 6.

The pivoting member 180 is located in the position shown by solid lines, in which it latches with pawl 192. The counterweight G is in its highest position (FIG. 2a), for which all the upper partial weights 302, 303, 304, 305 rest on the lowermost partial weight 301 which is connected to the cable 300, whereby the sum of all the partial weights acts as counterweight.

No load acts on lifting frames 313, 314, 315 for that position, and therefore it does not matter whether they are raised or lowered. If on the other hand the first upper lifting frame 316 were raised, it would carry the upper part 305b of the uppermost partial weight 305, whereby this part would not contribute to the effective weight of the counterweight.

All the lift frames 313 through 316 are lowered into their lower position during the operational pause prior to releasing the pawl 192, so that the weight of part 305b contributes to the effective weight of the counterweight G. Alternately, the tension in cable 317 can be relaxed such that the lifting trays will descend during the counterweight G descent without significantly retarding the latter.

Once the pawl 192 is released, the pivoting member 180 receives an initial acceleration generated by the sum of all complete partial weights 301, 302, 303, 304, 305 including the upper part 305b of partial weight 305.

Figure 2:
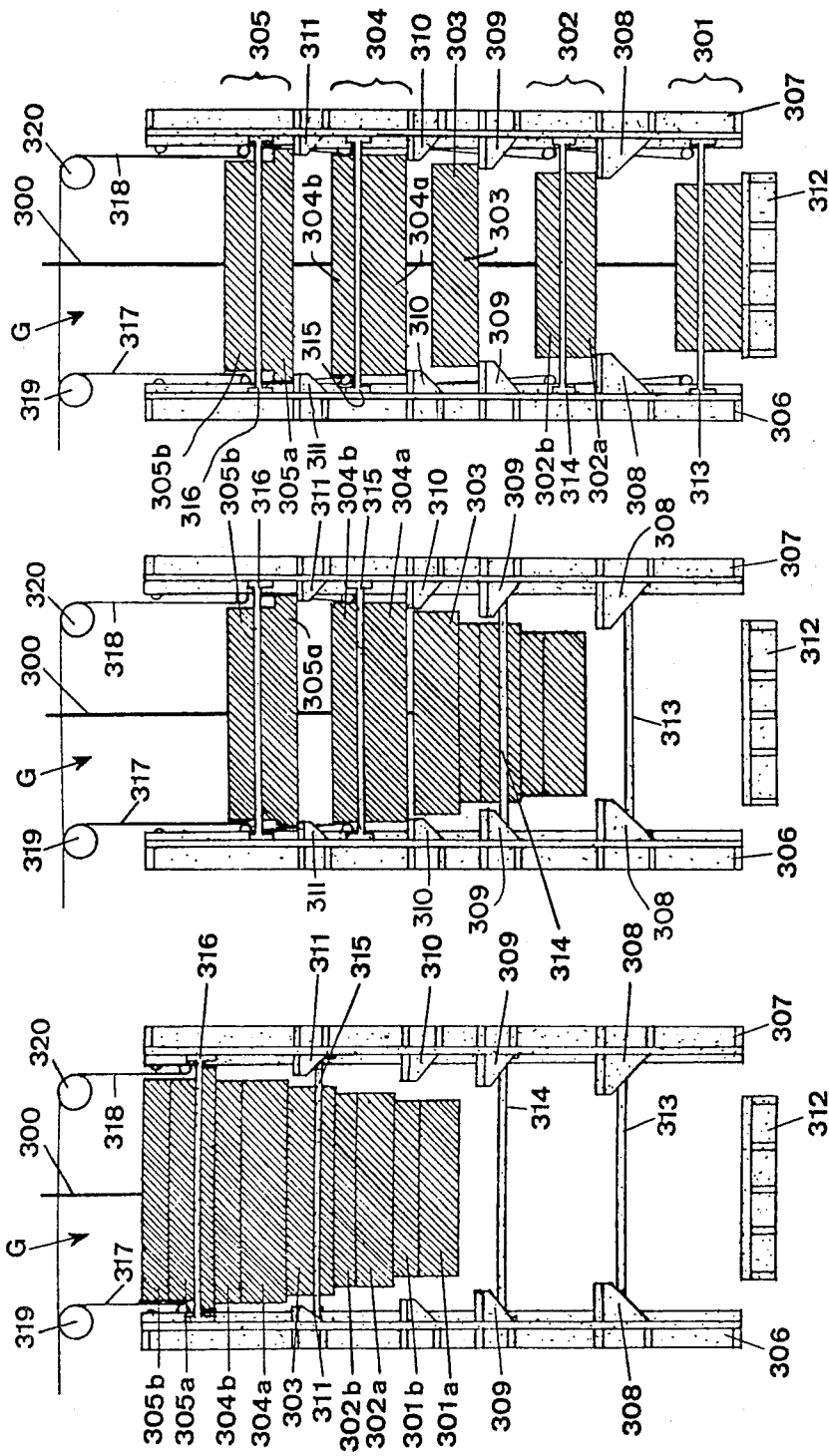
FIGS. 2a, 2b and 2c are partly schematic elevational views of a first embodiment of the counterweight system according to the invention in three different operative positions.
Figure 3:
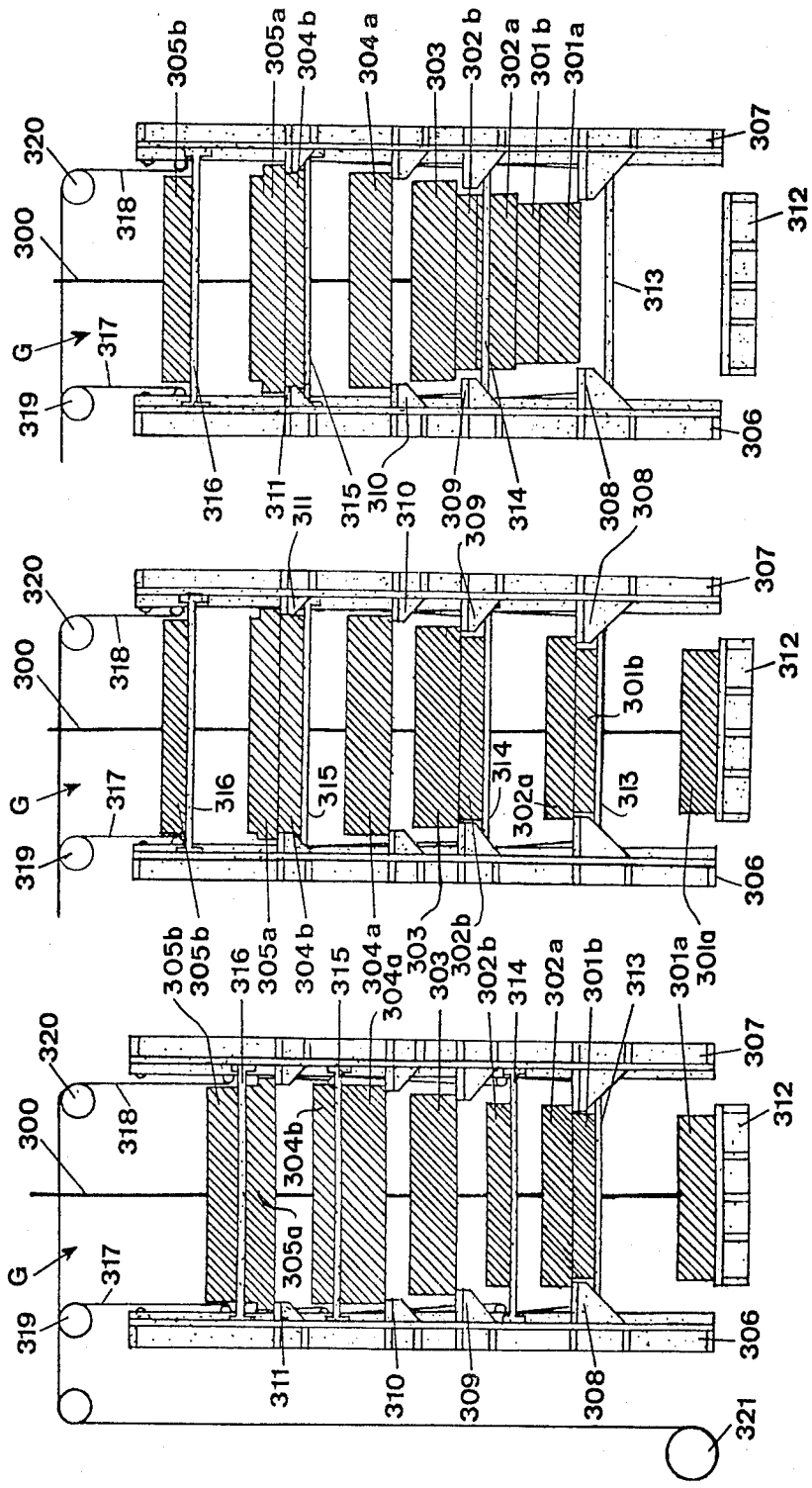
FIGS. 3a, 3b and 3c are three additional views similar to FIGS. 2a, 2b and 2c showing one counterweight system in three further operational positions.

During the further rise of the pivoting member 180, the effective weight of counterweight G is stepwise decreased by the partial weights 305, 304, 303, 302 being serially retained by projections 311, 310, 309, 308. FIG. 2 shows an intermediary phase of the descent of the counterweight, when partial weights 305 and 304 already have been retained.

The two parts of all divided partial weights 301, 302, 304, 305 can move together downward during this descent of the counterweight G because the associated lifting frames 313, 314, 315, 316 always assume their lowest positions. Therefore the full weight of both parts of these partial weights contributes to the weight of the counterweight until each divided partial weight is retained.

When at last the pivoting member 180 latches with the upper pawl 194 (dashed line position in FIG. 1), all the parts of the counterweight system assume the positions shown in FIG. 2c.

During the operational pause that follows and before the pawl 194 is released, the lifting frames 313, 314, 315, 316 and the upper parts 301b, 302b, 304b, 305b of the partial weights 301, 302 304, 305 resting on them are raised by means of winch 321 and the two lifting cables 317, 318 into their upper positions. The energy required for this lifting must be supplied by the winch.

Because the lifting cables 317, 318 are guided over alternatingly movable cable pulleys connected to the lifting frames and over spatially fixed cable pulleys in between, the lifting frames and the weight-parts resting on them are moved not simultaneously but sequentially. The sequence of this lifting is determined by the manner in which the weights of weight-parts 301b, 302b, 304b, 305b are stepped.

It is assumed in the embodiment shown in the drawing that the upper part 301b of weight-part 301 is lighter than the weight parts 302b, 304b, 305b resting on lifting frames 314, 315, 316. FIG. 5 immediately shows that when an upward tension is exerted on lifting cable 317, only the lifting frame 313 bearing the lightest weight can at first be pulled up while the other lifting frames 314, 315, 316 each remain in their lowest positions, in which the weight-parts 302b, 304b, 305b respectively borne by them rest on the associated lower weight-part 302a, 304a, 305a, respectively. Each of these lifting frames 314, 315, 315 can only be raised when the lower section of the lifting cable 317 passing over the associated fixed cable pulley 331, 333, 335, respectively can exert an opposing force equal to half the weight of the particular lifting frame and of the weight-part resting on it.

Accordingly when the winch 321 tightens lifting cables 317, 318, only the lifting frame 313 together with the weight-part 301b at first will rise, until this ascent is terminated by a fixed stop. It is assumed in FIG. 5 and 6 that this condition is achieved when the weight-part 301b hits the lower side of the partial weight 302 resting on projections 308. However, fixed stops to limit the ascent of each lifting frame may also be mounted to the posts 306,207; these stops for instance concerning the lifting frames 313, 314, 315 might be formed by the lower sides of the projections 308, 309, 311, respectively.

The moment the ascent of the lifting frame 313 is terminated by such a fixed stop, this lifting frame exerts an increased opposing force on the lifting cables 317,318, whereby that lifting frame shall now be raised which bears the next-heavier weight-part. It is assumed this is the lifting frame 314. Accordingly lifting frame 314 4ises, in the process lifting the upper weight-part 302b of partial weight 302 from the associated lower weight-part 302a and carrying it along upward. An intermediary phase of this ascent of lifting frame 314 is shown in FIG. 3a and also in FIGS. 5 and 6.

Once a fixed stop terminates the ascent of the lifting frame 314, for instance through the weight-part 302b hitting the underside of the partial weight 303 resting on the projections 310, lifting frame 315 with the weight-part 304b resting on it is raised next and at last the lifting frame 316 together with the weight-part 305b, until in the end all the lifting frames 313, 314, 315, 316 have reached their upper positions, as shown in FIG. 3b.

Accordingly, when pawl 194 is released, the parts of the counterweight system assume the positions shown in FIG. 3b. During the initial phase of the load's descent (sector A in FIG. 1), therefore, only the lower part 301a of the partial weight 301 is effective as counterweight. The pivoting member 180 hence receives a larger acceleration, and therefore is imparted a higher kinetic energy during this phase of motion than would be the case if the entire partial weight 3-1 acted as counterweight.

Once the lower part 301a of the partial weight 301 reaches the height of the lifting frame 313, it carries along the upper part 301b and also the lower part 302a of partial weight 302 resting on it. While the entire partial weight 301 is effective during this phase of motion, only the lower part 302a of partial weight 302 does contribute. The effective weight of the counterweight therefore also differs during this phase of motion from the effective weight during descent and formed by the sum of the complete partial weights 301 and 302.

As the weight-part 302a in its further ascent arrives at the weight-part 302b resting on the raised lifting frame 314, weight-part 302b is carried along and raised off the lifting frame 314 by the weight-part 302a.

As the weight-part 302b in its further ascent arrives at the undivided partial weight 303 resting on the projections 309, undivided partial weight 303 is carried along and raised off the projections 309 by the weight part 302b. This phase of the ascent is shown in FIG. 3c; in it, the effective weight of the counterweight G is as larbe as in the corresponding phase of descent.

During the last phase of motion (Section C of FIG. 1) the effective weight of the counterweight G is formed by the sum of the four lower partial weights 301, 302, 303, 304 and of the lower weight-part 305a of partial weight 305; the upper part 305b of the uppermost partial weight 305, already raised into the upper terminal position, remains inoperative during the descent of the load.

When lastly the pivoting member 180 again has reached the horizontal position and is latching with pawl 192, the winch 21 is actuated or constraint otherwise relaxed in the opposite direction during the operational pause that follows, whereby the lifting frames 313, 314, 315, 316 are moved again into their lower position. The components of the counterweight system then assume again the initial positions indicated in FIG. 2a. The described cycle can be repeated at will. Depending on system performance and motion control requirements, in some other cases it may be desirable to allow a controlled lowering of the lifting frames 313, 314, 315, 316 during the lowering of the pivoting member 180.

It is immediately clear that in every cycle, that energy is supplied to the system which is required to raise the weight-parts 301b, 302b, 304b, 305b by the height corresponding to the lift of the associated lifting frames. This additional energy is available to cover the losses occurring by friction, air resistance, etc.

Because in the described embodiment this energy is not supplied by simultaneously raising the weight-parts, these being brought into their upper positions sequentially, said energy supply can take place at relatively low power.

It can further be seen that in the described embodiment, the effective weight of the counterweight during the largest portion of the phases of the descent differs from the effective weight of the counterweight during the corresponding phases of the ascent. In this manner any desired motion can be implemented. By suitably selecting the number of the partial weights, the number of the weight-parts that can be raised by the lifting frames, the magnitudes of these weight-parts and the dimensions of the lift of the lifting frames, an arbitrarily fine stepping and accurate adaptation to the desired motion can be obtained.

The principle of supplying energy shall be described in relation to FIGS. 7 through 22, such supply taking place during counterweight G ascent or the pauses between operation and for a counterweight system of which the partial weights are not retained by fixed stop means but rather are so connected along one another that a limited vertical motion relative to and between two particular adjacent partial weights shall always be feasible. This corresponds to the basic principle of my above mentioned prior application, FIG. 11, and shall be described below for the special case in which the partial weights can be telescoped into each other.

FIGS. 7 and 8 show a counterweight system with partial weights telescoping into one another, represented in a partial front view section and side view section respectively.

The counterweight G is suspended from a cable 400 which is connected to a load and for instance passes over a guide roller 401 supported by a beam 402 mounted to a wall 403, cable 400 passing through this wall. Wall 403 for instance may correspond to wall 182 of FIG. 1 if cable 400 is connected with the pivoting member 180 in lieu of the cable 183 shown in that figure.

A support means 404 is mounted on wall 403 underneath beam 402, a downward projecting carrier pipe 405, with an outward flange 406 at its lower end, being fastened to said support means 404. The carrier pipe 405 is mounted in such manner that the cable 400 directed downward by guide roller 401 passes without touching through the hollow inside of carrier pipe 405.

The counterweight G consists of six partial weights 407, 408, 409, 410, 411, 412 of identical cross-sectional shapes but of different cross-sectional dimensions. The shape of the cross-section is arbitrary; it may be circular or square, but is rectangular in the embodiment shown. Partial weight 407 comprises an upper sealing wall 407a with a central aperture through which passes the carrier pipe 405. This central aperture is of such dimensions that the partial weight 407 can glide vertically on carrier pipe 405, but cannot exceed the rim 406 of said pipe. The partial weight 407 furthermore is hollow and open at its lower end, where it is provided with an outwardly projecting flange 407b.

The partial weights 408 through 411 also are hollow and each is open at both upper and lower ends. The inside cross-section of the partial weight 408 is of such dimensions that it fits in gliding manner over the flange 407b of partial weight 407. The partial weight 408 is provided at its upper end with an inward flange 408a which extends over the flange 407b of the partial weight 407 and can glide along the outer surface of this partial weight 407. Again an outward flange 408b is provided at the lower end of the partial weight 408.

Similarly each of the following partial weights 409, 410, 411 is provided with an inward flange 409a, 410a, 411a at its upper end and with an outward flange 409b, 410b, 411b at its lower end, their design and assembly being such that always the inward upper flange of a partial weight extends over the outward lower flange of the preceding partial weight. The lowermost partial weight 412 also is provided with an inward flange 412a at its upper end, said flange 412a extending over the lower flange 411b of partial weight 411; the lower end of partial weight 412 is closed by a sealing wall 412b.

Cable 400 passes through the hollow inside of all the partial weights and the lower end of this cable is anchored in the lower sealing wall 412b of the partial weight 412. The outward flanges 406, 407b 407b, 408b, 409b, 410b, 411b form stop means each of which retains one partial weight during its descent, whereby its weight is transmitted by the carrier pipe 405 to support 404 while cable 400 is relieved by the weight of each retained partial weight.

For the position shown in solid lines in FIGS. 7 and 8 of the telescoping counterweight G, each partial weight is supported by the one immediately above it, and the uppermost partial weight 407 is borne by the carrier pipe 405. Accordingly the entire counterweight G is suspended from the carrier pipe 405, and the cable is wholly relieved.

When cable 400 is pulled upward, for instance on account of the load moving down, the cable first carries partial weight 412 up with it, which will glide telescopingly over the next partial weight 411. Only the weight of partial weight 411 acts as counterweight in this phase. When during the ascent the lower sealing wall 412b of partial weight 412 comes to rest against the lower flange of partial weight 411, partial weight 411 also will be carried along as the ascent continues, whereby the effective counterweight presently is the sum of the partial weights 411 and 412. The remaining partial weights are sequentially carried along in the course of further ascent, so that the effective counterweight increases stepwise. In the position shown in FIG. 9 for instance, the effective counterweight G is given by the sum of the partial weights 412, 411 and 410. During the last phase of the motion, shown in FIG. 10, the last partial weight 407 also is lifted off the flange 406 of carrier pipe 405, whereby all the partial weights act as counterweight.

All the partial weights are telescoped into one another in the uppermost position shown in FIG. 10.

The effective counterweight decreases stepwise in corresponding manner during descent, partial weight 407 first being retained from carrier pipe 405, partial weight 408 next from partial weight 407, etc.

A first embodiment is shown in FIGS. 11 through 18, using a telescoping counterweight of the kind shown in FIG. 7 through 10 to achieve varyingly effective counterweights, if desired, in corresponding phases of ascent and descent, particularly for the purpose of supplying additional energy during operational pauses.

Figure 11:
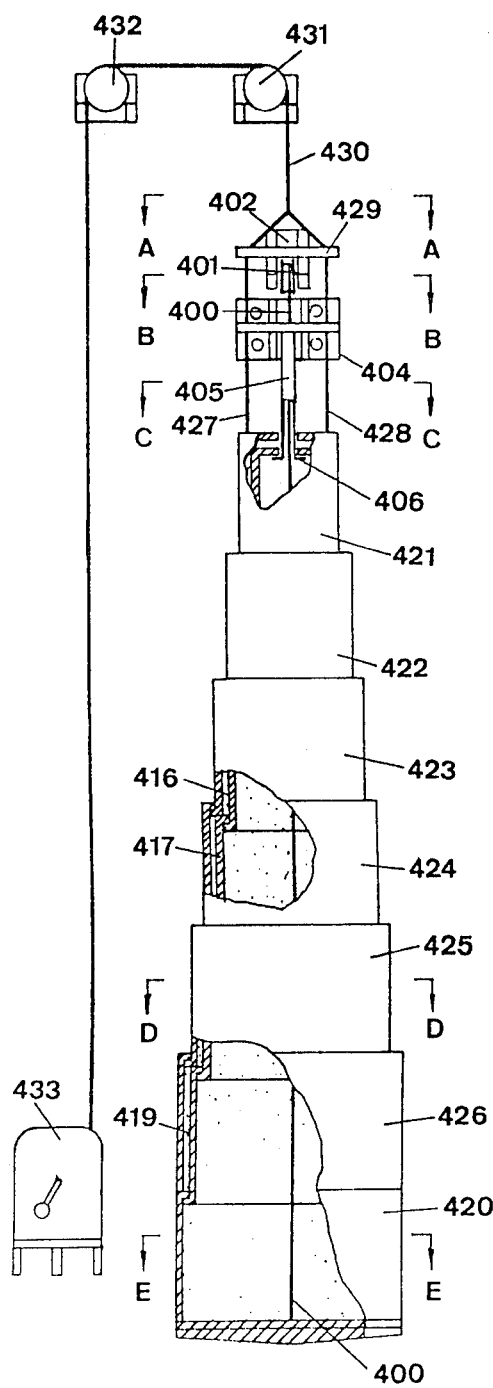
FIG. 11 is a partial section in front view of a counterweight system of the invention with a telescoping counterweight.
Figure 12:
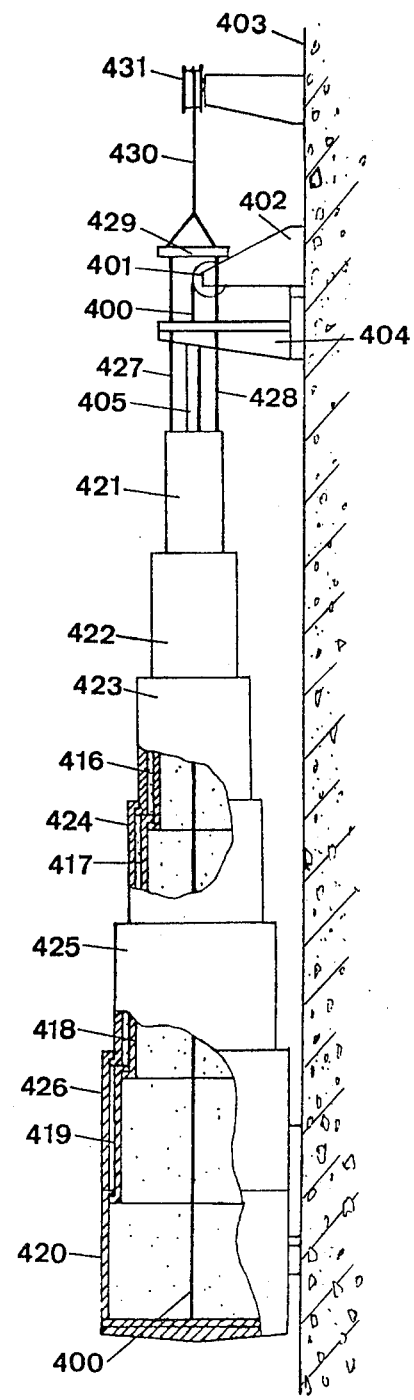

For the counterweight system shown in a partial front view section in FIG. 11, in a partial side view section in FIG. 12 and in section in FIG. 13, cable 400 is used again, which passes over the guide roller 401 supported in a beam 402, and again a support 404 is used mounted in wall 403, the downward extending carrier pipe 405 with outward flange 406 being fastened to said support 404.

The counterweight G comprises a first group of telescoping partial weights 414, 415, 416, 417, 418, 419, 420 which are designed similarly to the partial weights 407 through 413 of FIGS. 7 and 8 and also are mounted similarly. In particular, the uppermost partial weight 414 comprises an upper sealing wall with a central aperture which can glide on carrier pipe 405, and an outward flange at the lower end. The partial weights 415, 416, 417, 418, 419 each are open at the top and the bottom, comprise an outward flange at the lower end and an inward flange at the upper end, latter flange extending over the lower flange of the next-smaller partial weight. The lowermost partial weight 420 also comprises an inward flange at the upper end and a sealing wall at the lower one, the end of cable 400 being anchored in said lower-end sealing wall.

Accordingly the assembly and functioning of this first group of partial weights 414 through 420 entirely correspond to the description of the telescoping counterweight of FIGS. 7 through 10.

However, the embodiment of FIGS. 11 through 18 also comprises a second group of partial weights 421 through 426 which on the whole are of the same design and assembly as the partial weights 414 through 419 of the first group but which surround the partial weights of the first group. The uppermost partial weight 421 of the second group corresponds in cross-section approximately to that of the second partial weight 415 of the first group, so that it can surround with play the first partial weight 414 of the first group. Also, the uppermost partial weight 421 of the second group comprises an upper sealing wall with central aperture which can glide on the carrier pipe 405, an an outward flange at the lower end. The remaining partial weights 422 through 426 of the second group increase in cross-section, so that they can seat with play the corresponding partial weights of the first group. Each of the partial weights 422, 423, 424, 425 comprises an outward flange at its lower end, and an inward flange at its upper end and extending over the lower flange of the next-smaller partial weight. The sixth partial weight 426 of the second group, which is of approximately the same cross-section as the seventh partial weight 420 of the first group, is open at the lower end.

Figure 15:
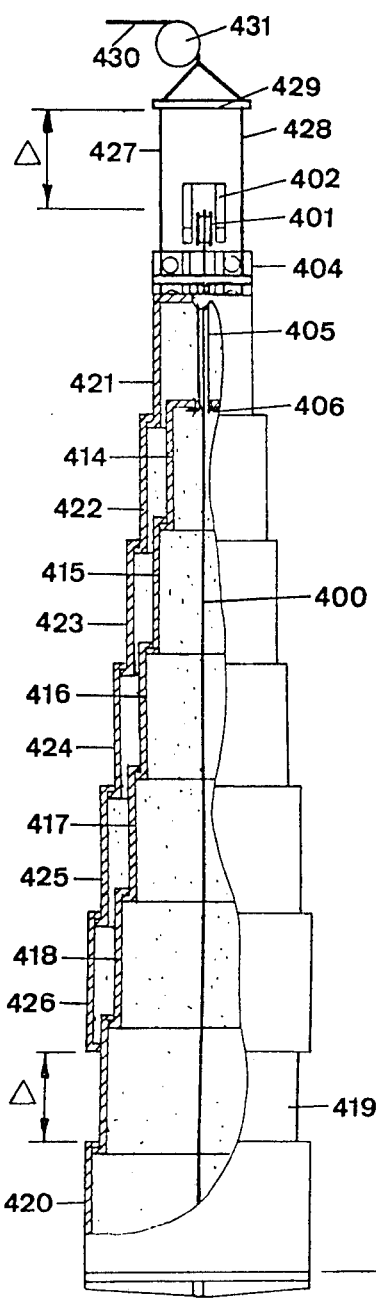
FIG. 15 shows a partial section in front view of the counterweight system of FIGS. 11 through 14 for a different operational position.

The uppermost partial weight 421 of the second group is suspended from a lifting cable 430 by the intermediary of two support cables 427,429 spaced apart by a crossbeam 429, lifting cable 430 passing over guide rollers 431, 432 to a winch 433 (FIG. 11). By actuating the winch and by means of the lifting cable 430, the second group of partial weights therefore can be raised with respect to the first group (FIG. 15). If on the other hand, the lifting cable is actuated in the opposite direction, the partial weights of the second group will be lowered onto those of the first group. In this position, shown particularly clearly in FIG. 13, partial weight 431 rests by its lower flange on the upper one of partial weight 415, partial weight 422 rests by its lower flange on the upper one of partial weight 416, partial weight 423 by its lower flange on the upper one of partial weight 417, partial weight 424 by its lower flange on the upper one of partial weight 418, partial weight 425 by its lower flange on the upper one of partial weight 419, and lastly partial weight 426 by its lower flange on the upper one of partial weight 420. If for this position the cable 400 were pulled up, the two partial weights 420 and 426 would move together, their sum then forming the counterweight in this first phase of motion. Correspondingly the partial weights 419 and 425, partial weights 418 and 424, partial weights 417 and 423, partial weights 416 and 422 and lastly partial weights 415 and 421 would move pairwise.

If on the other hand the second group of partial weights during the pause prior to the ascent of cable 400 were raised a distance Δ relative to the first group by actuation of the lifting cable 430 from winch 433, (FIG. 15), a spacing Δ will exist between each partial weight of the first group and its cooperating partial weight of the second group, as indicated in FIG. 15 for the lowermost partial weights 420 and 426. When for this position of the partial weights the cable 400 is pulled up, it carries along initially only the partial weight 420, which first alone acts as counterweight. Only after the partial weight 420 has been raised by a height Δ will the partial weight 426 also be carried along, the effective counterweight then being the sum of partial weights 420 and 426. During further ascent, the partial weight 419 is soon carried along, so that it too now contributes to the effective counterweight. Only after the partial weight 419, which belongs to the first group, has been raised by a height Δ, will it carry along its associated partial weight 425 of the second group. The same process is repeated during further ascent, each time a partial weight of the first group and a partial weight of the second group being alternatingly and sequentially carried along.

For the intermediary position shown in FIG. 16, where the counterweight G has been raised a height H, the effective counterweight is formed by the sum of the partial weights 420, 419, 418 of the first group and the partial weights 426, 424 of the second; partial weight 424 of the second group will be carried along next during further ascent.

When finally the counterweight G has reached its highest position, shown in FIG. 17, all the counterweights of the first group are telescoped into one another, and upon them rest the partial weights of the second group, telescoped in turn. The innermost partial weight 421 of the second group being suspended from support cables 427, 428, did not contribute to the effective counterweight during the final phase of the ascent.

During the subsequent resting pause prior to the descent of counterweight G, cable 430 and accordingly also crossbeam 429 and support cables 427 and 428 are lowered by means of winch 433 by a distance Δ, so that the partial weight 421 is released for the descent. When thereupon the cable 400 is moved in the opposite direction, so that the counterweight G moves downward (FIG. 18), the effective counterweight during the initial phase of motion (FIG. 18) is given by the sum of all the partial weights including partial weight 421. The effective counterweight therefore is larger by the weight of partial weight 421 in the first phase of descent than in the corresponding (last) phase of ascent.

When thereupon the partial weight 415 of the first group is retained by the lower flange of partial weight 414, it will simultaneously hold its associated partial weight 421 of the second group, whereby the effective weight of the counterweight is decreased by the sum of those two partial weights. The same process is repeated during the further descent for the other partial weights, on each occasion two of these, namely one from the first group and the associated one from the second, being made simultaneously ineffective.

It can be seen that the effective counterweight each time is larger by one partial weight during the various phases of descent than in the corresponding phases of ascent. At the end of descent all the components again assume the positions shown in FIGS. 11, 12 and 13, and the described cycle of operation can be repeated.

Again energy is supplied to this system by raising the partial weights of the second group by means of winch 433 and lifting cable 430 when the counterweight system is in its lowest position, where said energy is available to cover losses. It ought to be borne in mind that this energy is not recovered at the highest position of the counterweight when the lifting cable subsequently is lowered, such lowering taking place when the lifting cable is unloaded.

FIGS. 19 through 22 show another embodiment of a telescoping counterweight G comprising two groups of partial weights, of which the second can be raised a limited height with respect to the first when the counterweight assumes its lowest position, in order to introduce additional energy into the system.

Again a cable 500 is shown, which passes over a guide roller 501 supported in a beam 502 and through a wall 503, also shown being a support means 504 mounted to wall 503 to which is mounted a carrier pipe 505 vertically extending downward and comprising an outward flange 506, for the implementation of such an embodiment.

The counterweight G comprises a first group of mutually telescoping or similarly compacting partial weights 507, 508, 509, 510, 511, 512 which are designed and assembled similarly to the partial weights 407 through 413 of the telescoping or similarly compacting counterweight of FIGS. 7 through 10 and to the first group of partial weights 414 through 420 of the telescoping or similarly compacting counterweight of FIGS. 11 through 16. In particular the uppermost partial weight 507 comprises an upper sealing wall with a central aperture which can glide on carrier pipe 505, and an outward flange at the lower end. The partial weights 508, 509, 510, 511 always are open at both upper and lower ends and comprise an outward and inward flange respectively of the next-smaller partial weight. The lowermost partial weight 512 also comprises an inward flange at its upper end and a sealing wall at its lower end, into which is anchored the end of cable 500.

Figure 19:
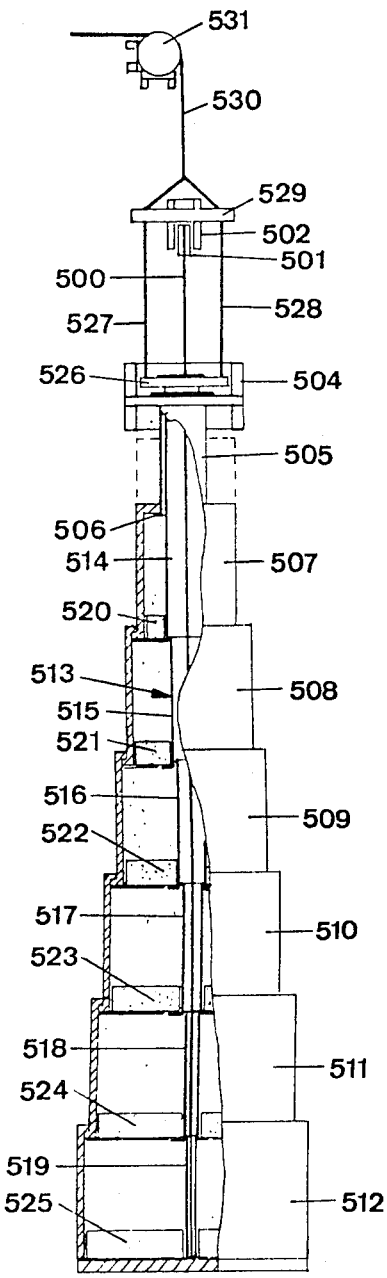
FIG. 19 is partial section in front view of another embodiment of a counterweight system of the invention with a telescoping counterweight.
Figure 20:
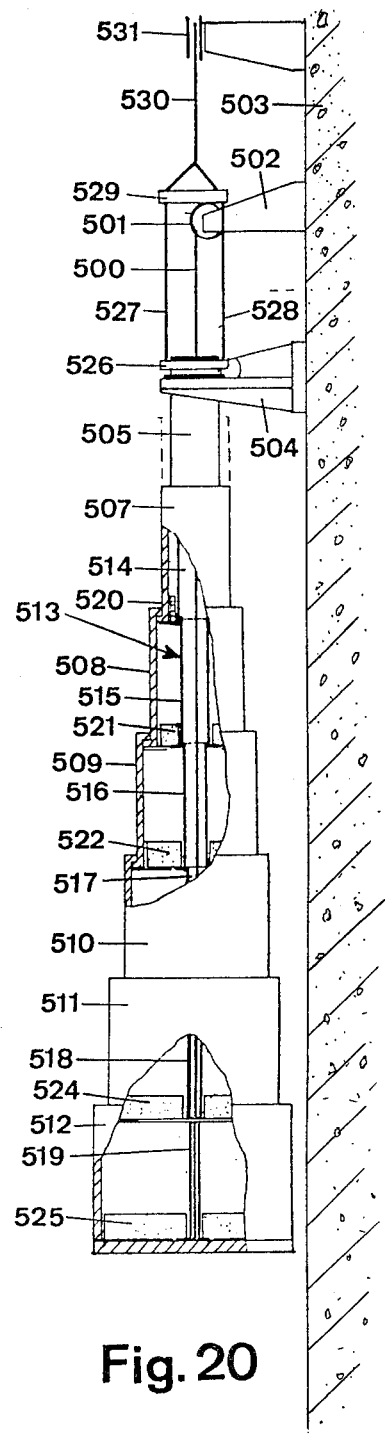
FIG. 20 is a partial section in side view of the counterweight system of FIG. 19.
Figure 21:
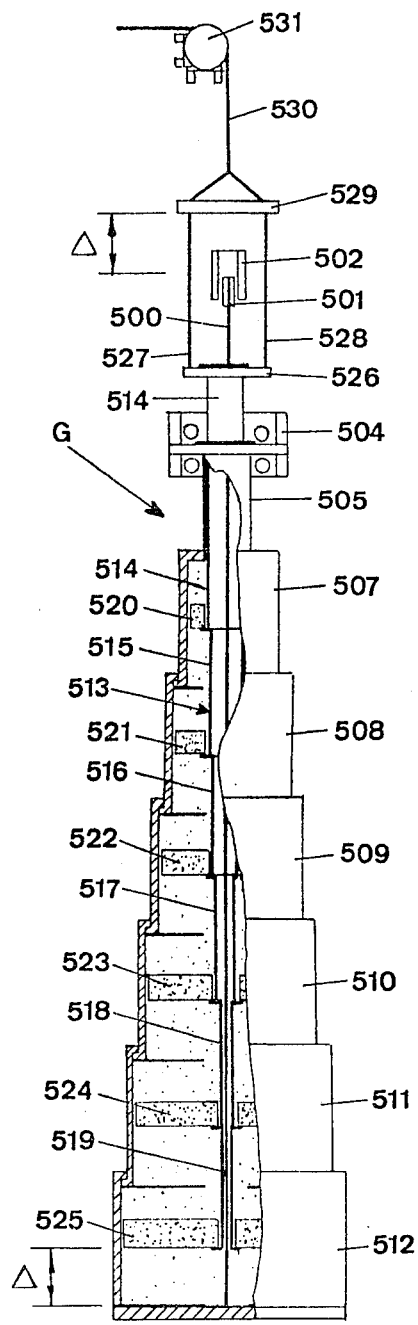
FIG. 21 is a partial section in front view of the counterweight system of FIGS. 19 and 20 for another operational position.

The second group of partial weights again is mounted coaxially with the first one, in contrast to the embodiment of FIGS. 11 through 18 this time, however, inside the first group. Provision is made to that end for a tubular support column 513 coaxially mounted with carrier pipe 505 and through the cavity of which passes the cable 500. The support column 513 consists of telescoping or otherwise compacting tubular segments 514, 515, 516, 517, 518, 519 comprising suitable limit means (not shown) by means of which each tubular segment when in the fully extended state is borne by the tubular segment immediately above it. Such limit means may be meshing flanges or rims such as in the partial weights 507 through 512 of the first group or pin-slot guides or similar. FIGS. 19, 20 and 21 each shows the support column 513 in the fully extended state, further extension being prevented by the limit means.

A solid, plate-like additional weight 520, 521, 522, 523, 524 and 525 of relatively little height is mounted to the lower end of each tubular segment 514, 515, 516, 517, 518, 519 respectively. Together with its attached additional weight each tubular segment forms a partial weight of the second group. As shown in the example, such attachment can be easily implemented by providing each additional weight with a center aperture fitted to the outer cross-section of the associated tubular segment and in that it rests on an outward flange of the particular tubular segment. The outer contour of each additional weight is always adapted to the cross-section of one of partial weights 507, 508, 509, 510, 511, 512 of the first group in such manner that it can move with play up and down the particular partial weight. Thus the profile of the additional weight 525 assuming the shape of a plate and fastened to the lowermost tubular segment 519 is fitted to the inside of partial weight 512 but still larger than the inside cross-section of the partial weight 511 located above. The platelike additional weight 524 fastened to the next tubular segment 518 can glide inside the partial weight 511 but is larger than the cross-section of partial weight 510, etc.

The outermost tubular segment 514 with the largest diameter, which is the uppermost tubular segment when the support column 513 is extended, is glidingly supported inside the carrier pipe 505 and connected with a support plate 526 at the upper end projecting beyond said pipe 505, said plate 526 being suspended from a lifting cable 530 by the intermediary of support cables 527, 528 which are kept apart by a crossbeam 529. The lifting cable 530 similarly to that denoted by 430 in the embodiment of FIGS. 11 through 18 passes over a guide roller 531 to a winch (not shown). By means of this winch and lifting cable 530, the tubular segment 514 and accordingly when in the extended state the entire support column 513 together with all the additional weights 520, 521, 522, 523, 524, 525 of the second group can be raised by a height Δ (FIG. 21) relative to the first group of partial weights.

The length of tubular segment 514 is such that for the lowered position (FIGS. 19 and 20), the underside of the plate-like additional weight 520 mounted to its lower end is at the level of the lower edge of the upper partial weight 507, even when latter assumes its lowest position, in which it is suspended from carrier pipe 505. The lengths of the remaining tubular segments 515, 516, 517, 518, 519 also are such that for the lowered position of the support column 513, each of the plate-like additional weights 521, 522, 523, 524, 525 of the second group they are bearing lies in the same plane with the lower edge of the associated partial weight 508, 509, 510, 511, 512 of the first group, whereby the lowermost platelike additional weight 525 rests on the lower sealing wall of partial weight 512. (FIGS. 19, 20). If in this position the cable 500 were pulled up, the two partial weights 512 and 519-525 would move together, so that in this first phase of motion the sum of these partial weights would be the effective counterweight. If then the upper side of the platelike additional weight 525 were to hit the undersides of partial weights 511 and 518-524, it would carry these along, whereby again their sum would increase the effective counterweight by that amount. Correspondingly, in a sequential manner, the partial weights 510 and 517-523, 509 and 516-522, 508 and 515-521 and lastly 507 and 514-520 would subsequently become effective, progressively increasing the counterweight magnitude.

If on the other hand the second group of partial weights during the pause prior to ascent of cable 500 is raised by a height Δ relative to the first group (FIG. 21) by means of a winch (not shown) and through actuation of cable 530, there will be a spacing Δ between the underside of every partial weight of the first group and the underside of the partial weight associated with it from the second group, as shown in FIG. 21 for the lowermost partial weights 512 and 519-525. If for this position of the partial weights the cable 500 is pulled up, it will carry along the partial weight 512 of the first group in its initial motion, which first alone acts as the effective counterweight as the sum of partial weights 512 and 519-525. In the course of further ascent, only the partial weight 511 will be seized again, and only when this partial weight 511 has been raised a height Δ shall the associated partial weight 518-524 of the second group become effective. The same process is repeated during the further ascent, one partial weight of the first group and one from the second alternatingly and sequentially being carried along.

Figure 22:
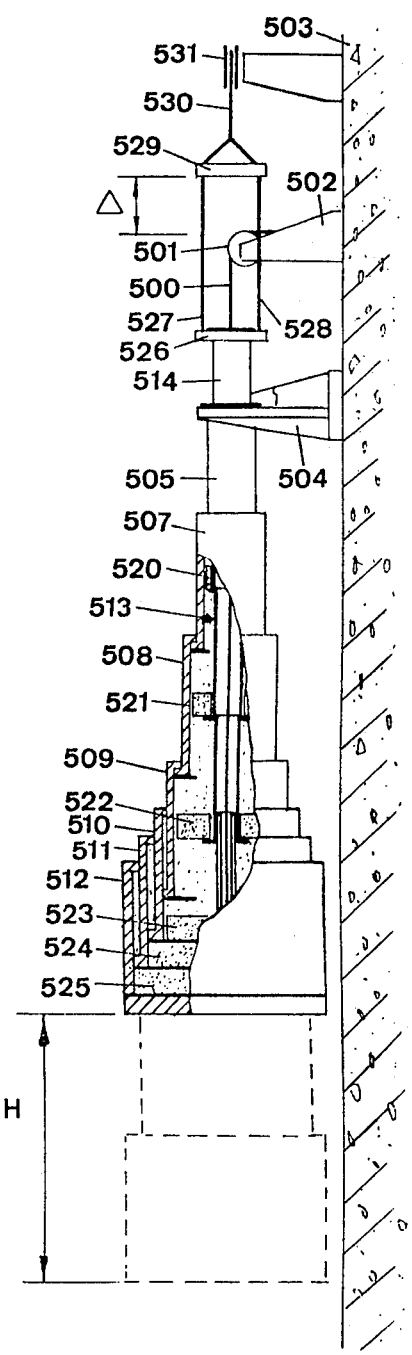
FIG. 22 is a partial section in side view of the counterweight system of FIGS. 19 through 21 for a partly raised counterweight.

For the intermediary position shown in FIG. 22 in which the counterweight G has been raised by an amount H, the effective weight of this counterweight is given by the sum of the partial weights 512, 511, 510 of the first group and of partial weights 519-526, 518-524, 517-523 of the second group; the partial weight 509 of the first group then will be carried along next as the ascent continues.

The ascent of counterweight G is terminated when the plate-like additional weight 521 hits the underside of the uppermost tubular segment 514 and the additional weight 520 it bears. The partial weight 514-520 of the second group accordingly does not contribute to the effective counterweight in the final phase of ascent either.

During the ensuing operational pause prior to the descent of counterweight G, lifting cable 530, crossbeam 529 and the support cables 527, 528 are lowered by an amount Δ by means of a winch (not shown) so that the tubular segment 514 and the additional weight 520 are released for said descent.

When thereupon the cable 500 is moved in the opposite direction whereby the counterweight G moves downward, the effective counterweight during the initial phase of motion is given by the sum all partial weights including partial weight 514-520. Therefore the effective counterweight in the first phase of descent is larger by the partial weight 514-520 than during the corresponding (last) phase of ascent.

When after that the partial weight of the first group 507 is retained by the lower flange of carrier pipe 505, the partial weight 514-520 is simultaneously held by support cables 527 and 528, whereby the effective counterweight is decreased by the sum of these two partial weights. The same process is repeated in the course of the further descent, each time two associated partial weights—namely one from the first and one from the second groups—being simultaneously rendered ineffective. Of course, by design, these two partial weights can be quite different in weight (mass).

It can be noted that during various phases of the descent, the effective counterweight always exceeds by one partial weight from the second group its magnitude during the corresponding phase of ascent. At the end of descent, all components then resume the positions shown in FIGS. 19 and 20, and the described operational cycle can be repeated again.

Additional energy is introduced into the system through the lifting of the partial weights of the second group by means of lifting cable 530 when the counterweight is in its lowest position, which energy can be used to cover the losses. This energy is not regained during the later descent of the lifting cable when the counterweight is in the highest position because said descent takes place for an unloaded lifting cable.

All the embodiments of the counterweight system described above therefore allow to cyclically actuate a load at the cost of only very low outside power or force because the supply of external energy is restricted to covering the losses and can be spread over a large time interval. On the other hand the energy required to actuate the load remains as reactive power within the system; this reactive power can be very high, so that even very heavy loads can be raised or lowered in short time intervals.

The subdivision into two groups of partial weights of the counterweight consisting of these, where one group may be raised or lowered a limited distance with respect to the other, allows adapting the force-path curve and hence the acceleration and deceleration of the load to any kind of motion. Several parameters are available to implement this goal, such as the weights of the different partial weights, the distance by which they may be displaced with respect to each other, and the locations along the path of motion where they are retained or rendered effective. It is possible therfore to rapidly move even heavy and complex loads with pronounced non-linear force-path relationships, and still to have them coast gently into the terminal positions.

What is claimed is:

1. A counterweight system to enable cyclic movements of a load by the application of low external power to the system comprising a counterweight connected in counter-balancing relationship to a load, said counterweight being divided into two separate groups of separately formed counterweight segments of graduated size, a first movement means connected between the load and one group of counterweight segments and being operable to elevate and lower in succession the counterweight segments in said one group one relative to another, and a second movement means independent from the first movement means connected between the other group of counterweight segments and an external power means, the second movement means being operable under influence of the external power means to elevate and lower the counterweight segments in said other group relative to the counterweight segments in said one group.

2. A counterweight system to enable cyclic movements of a load by the application of low external power to the system comprising a counterweight connected in counterbalancing relationship to a load, said counterweight being divided into two separate groups of separately formed counterweight segments of graduated sizes, a first cable movement means connected between the load and one group of counterweight segments and being operable to elevate and lower in succession the counterweight segments in said one group one relative to another, and a second cable movement means independent from and unconnected with the first cable movement means, said second cable movement means being connected between the other group of counterweight segments and an external power means, and the second cable movement means being operable under influence of the external power means to raise and lower the counterweight segments in said other group relative to the counterweight segments in said one group.

3. A counterweight system as defined in claim 2, and each counterweight segment of each group being sub-divided into separately formed weight elements, the sub-divided weight elements of each group being adapted to interfit nestingly and the two groups of counterweight segments also interfitting nestingly, whereby the two groups may be substantially collapsed one within the other.

* * * * *